(No Model.)

A. WILBUR
Car Wheel.

No. 234,699. Patented Nov. 23, 1880.

Witnesses.
C. L. Parker
R. H. Whittlesey

Inventor Alfred Wilbur
By Attorney George H. Christy.

UNITED STATES PATENT OFFICE.

ALFRED WILBUR, OF ALLEGHENY, PENNSYLVANIA.

CAR-WHEEL.

SPECIFICATION forming part of Letters Patent No. 234,699, dated November 23, 1880.

Application filed October 9, 1880. (No model.)

*To all whom it may concern:*

Be it known that I, ALFRED WILBUR, of Allegheny city, county of Allegheny, State of Pennsylvania, have invented or discovered a new and useful Improvement in Car-Wheels; and I do hereby declare the following to be a a full, clear, concise, and exact description thereof, reference being had to the accompanying drawings, making a part of this specification, in which—like letters indicating like parts—

Figure 2:
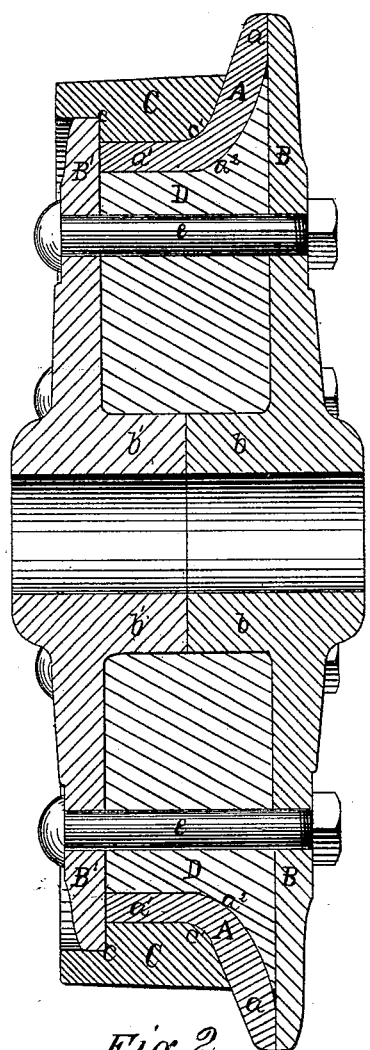
Figure 1:
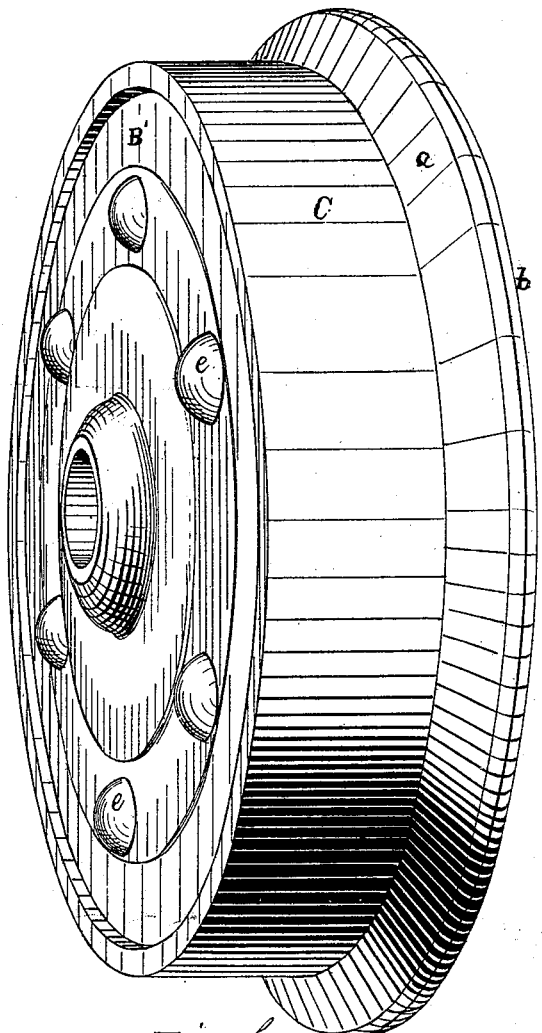

Figure 1 is a perspective view of my improved car-wheel, and Fig. 2 shows a transverse central section of the same.

My invention relates to an improvement in car-wheels; and it consists in forming the wheel with a plain unflanged tire, a flanged wrought-metal rim, on which the tire is set, (with or without a filling within the rim,) and disk-plates which serve to strengthen, bind, and hold the parts in place and furnish a hub for attaching the wheel to the axle. These parts of the wheel are constructed as follows: A rim, A, is formed of wrought metal, iron, or steel, having when formed a flange, $a$, and tread, $a'$, of the desired width. In forming this rim a disk-plate of proper heft is provided, its diameter being equal to the extreme diameter of the flange on the completed wheel. The center of such disk is cut out, leaving an annulus of metal, on the interior edge of which a flange is turned to form the tread $a'$ or tire-bed of the rim, while that part of the plate at its periphery in, or nearly in, the original plane of the disk forms a wheel-flange, $a$. This operation in forming the rim A can be performed quickly, cheaply, and with great accuracy on machines substantially such as are used for flanging flue-holes in boiler-heads.

It will be observed that this method of forming the rim gives a curved angle, as at $a^2$, between the parts $a$ and $a'$. This curve I consider important and useful, as by means of it the rim is made much stronger for a given quantity of metal than though the angle were abrupt. This rim is supported in the wheel by means of two disk-plates or caps, B and B', which are, by preference, made of cast-iron, and are provided at their centers with hub-extensions $b$ $b'$, for securing the wheel to the axle.

The outer or larger disk, B, is made equal in diameter to the flange $a$, and its inner face is made to fit tightly against the back of the flange and make a close joint therewith, so as to exclude dirt from the interior of the wheel. Also, this disk or cap serves to re-enforce or support the flange $a$ and prevent it from being turned outward. Also, if the part $a$ should become cracked or broken the periphery of the disk or cap will still perform the function of a flange in keeping the wheel on the rail. By this feature of construction I provide in effect a double flange, the parts of which have a bracing action against each other, thereby increasing the strength and security of this part of the wheel.

The inner or smaller disk, B', is made substantially like the disk B, except that it is smaller in diameter, though its diameter is somewhat greater than that of the tread $a'$ of the rim. Both disks or caps have an inner face bearing against the rim, and they are firmly bound together by a number of bolts, $e$.

A steel tire, C, is shrunk or otherwise secured upon the outer periphery of the tread $a'$, its thickness being less than the height of the flange $a$ and its width a little greater than that of the tread $a'$. The under-face edge of this tire is rabbeted, as at $c$, thus forming a covered seat for the periphery of the disk B', which bears not only upon the edge of the rim, but also laps onto or partially covers and bears against the edge of the tire, and thereby prevents the tire from working off on that side of the wheel. Also, if keys be employed to tighten the tire, as may be done, this disk will also cover the outer ends of such keys, and thereby hold them in place. The tire is prevented by the flange $a$ from working off that side of the wheel. In order that the tire may fit well into the angle between the parts $a$ and $a'$ of the rim I bevel or round its inner lower corner or edge, as at $c'$. The tire will thus have a firm seat on the rim.

The space within the rim A and between the caps B B' may be filled with any suitable material D for deadening or muffling the sound of the wheel, as well as for strengthening it. Wood is well adapted for this purpose, and to secure the best results it may be forced into the rim or fitted to fill the space quite full. Various compositions or kinds of material are known and used for this purpose, and I do not limit my invention to any particular one.

Among the advantages secured by my improved car-wheel are the following: The tire C is so held in place by the cap B' on one side and the flange $a$ on the other side that it cannot get off or out of place except by breaking, and then, unless it breaks at two points in its circumference, it will in most cases be kept in place on the wheel; but if the tire should be so broken it would not affect the integrity of the flange $a$, which is entirely independent of the tire; also, a firm and durable tread, $a'$, would still be left for the wheel sufficient to support the truck and run for a considerable time without danger of further breaking. The tire can readily be renewed when worn with comparatively little expense. The parts of the wheel which are most liable to be broken—viz., the the tire and rim—are made of wrought metal and in a way that secures both economy and strength. The flange of the wheel—a very important part—is doubly secured, and by the arrangement shown and described the face $a$ of the wheel-flange, which bears against the rail, may be made of steel and tempered, thereby increasing its hardness and capacity to withstand the severe wear to which it is subjected in use. Moreover, the bracing support afforded to the flange by the cap B not only strengthens it against a continued or uniform pressure, but also better enables it to resist sudden and violent shocks, which are the usual cause of breakage in car-wheels. These advantages, both in construction and utility, are very important, and the security afforded both to life and property by this improvement is no less important.

The double provision against breakage in the tread and in the flange, as described, will prevent danger or harm even in case some one of these parts should fail.

I claim herein as my invention—

1. A car-wheel having a rim, A, composed of a flange, $a$, and tread $a'$ with a plain or unflanged tire, C, on the tread, a cap or disk, B, having a diameter equal, or nearly equal, to that of the flange $a$, and a cap, B', having a diameter in excess of the diameter of the tread $a'$ and less than the diameter of the tire, the periphery of such cap being arranged to lap onto or cover in part the adjacent edge of the tire, substantially as and for the purposes set forth.

2. In a car-wheel, a wrought-metal rim, A, having a flange, $a$, and tread $a'$ of equal, or nearly equal, thickness, with a rounded angle, $a^2$, connecting the flange and tread, in combination with an unflanged tire, C, and caps B B', the same being arranged substantially as set forth.

3. A car-wheel having a wrought-iron or steel rim, A, composed of a tread, $a'$, and flange $a$, such parts being of equal, or nearly equal, thickness, an unflanged tire, C, secured on the periphery of the tread $a'$, and a cap, B, secured against the back face of the flange and equal in diameter thereto, substantially as set forth.

4. A car-wheel having a rim, A, composed of flange $a$ and tread $a'$, a cap, B', bound against the edge of the tread, such cap having a diameter in excess of that of the tread, and an unflanged tire, C, secured on the face of the tread between the periphery of the cap B' and the flange $a$, substantially as set forth.

In testimony whereof I have hereunto set my hand.

ALFRED WILBUR.

Witnesses:
R. H. WHITTLESEY,
C. L. PARKER.